United States Patent
Warren et al.

(10) Patent No.: US 12,487,425 B2
(45) Date of Patent: Dec. 2, 2025

(54) COUPLING OPTICAL FIBERS AND COOLING FLUID PASSAGES

(71) Applicant: Raytheon Technologies Corporation, Farmington, CT (US)

(72) Inventors: Eli Warren, Wethersfield, CT (US); David Dodds, Jupiter, FL (US); Bryan J. Hackett, Berlin, CT (US); Alan E. Ingram, Palm City, FL (US); Michael F. Sabol, Port St. Lucie, FL (US); Nicholas O'Gara, West Palm Beach, FL (US); Kyle Hardwick, Jensen Beach, FL (US)

(73) Assignee: RTX CORPORATION, Farmington, CT (US)

( * ) Notice: Subject to any disclaimer, the term of this patent is extended or adjusted under 35 U.S.C. 154(b) by 324 days.

(21) Appl. No.: 18/124,399

(22) Filed: Mar. 21, 2023

(65) Prior Publication Data

US 2024/0319468 A1     Sep. 26, 2024

(51) Int. Cl.
*G02B 6/44*     (2006.01)
*F16L 25/01*     (2006.01)
(Continued)

(52) U.S. Cl.
CPC ............ *G02B 6/4459* (2013.01); *F16L 25/01* (2013.01); *G01M 15/02* (2013.01); *G01M 15/14* (2013.01)

(58) Field of Classification Search
CPC .. G02B 6/4459; G02B 6/3814; G02B 6/3825; G02B 6/3831; G02B 6/3624; F16L 25/01; G01M 15/02; G01M 15/14; F01D 17/06; F01D 11/24; F01D 21/02; F01D 21/04; F01D 21/003; F05D 2270/8041
See application file for complete search history.

(56) References Cited

U.S. PATENT DOCUMENTS

| | | | |
|---|---|---|---|
| 4,432,603 A | | 2/1984 | Morency |
| 4,988,155 A | * | 1/1991 | Harner .................. G01N 21/85 |
| | | | 385/12 |

(Continued)

FOREIGN PATENT DOCUMENTS

CN     112129400 B     3/2023

OTHER PUBLICATIONS

EP Search Report for EP Patent Application No. 24165290.8 dated Jul. 11, 2024.

*Primary Examiner* — Timothy P Graves
(74) *Attorney, Agent, or Firm* — Getz Balich LLC

(57) ABSTRACT

An optical system is provided that includes a conduit fitting, a first connector, a first conduit, a first ferrule and a first nut. The conduit fitting includes a receptacle. The first connector is disposed within the receptacle. The first connector includes a first bore, a first counterbore and a first port radially outboard of the first bore. The first conduit includes a first optics line and a first fluid passage. The first conduit projects longitudinally into the first counterbore and is attached to the first connector. The first optics line projects longitudinally into the first bore. The first fluid passage is fluidly coupled with the first port. The first ferrule circumscribes the first connector. The first nut is threaded onto the conduit fitting and is configured to wedge the first ferrule radially between the first connector and the conduit fitting.

16 Claims, 14 Drawing Sheets

(51) Int. Cl.
*G01M 15/02* (2006.01)
*G01M 15/14* (2006.01)

(56) References Cited

U.S. PATENT DOCUMENTS

| | | | |
|---|---|---|---|
| 5,548,674 A * | 8/1996 | Rondeau | G02B 6/3835 |
| | | | 385/72 |
| 5,940,561 A | 8/1999 | Dean, Jr. | |
| 8,491,199 B1 | 7/2013 | Dang | |
| 9,360,643 B2 | 6/2016 | Rinzler | |
| 10,451,826 B2 | 10/2019 | Andrus | |
| 10,768,059 B2 | 9/2020 | Warren | |
| 10,794,795 B2 | 10/2020 | Warren | |
| 2004/0036290 A1 * | 2/2004 | Bock | F16L 25/01 |
| | | | 285/343 |

\* cited by examiner

COUPLING OPTICAL FIBERS AND COOLING FLUID PASSAGES

BACKGROUND OF THE DISCLOSURE

1. Technical Field

This disclosure relates generally to optics and, more particularly, to a coupler for coupling optical fibers.

2. Background Information

Optical fibers may be used for various applications including transmitting light signals for an optical probe. Optical fibers may be optically coupled together by an optical coupler. Various types and configurations of optical couplers are known in the art. While these known optical couplers have various benefits, there is still room in the art for improvement. There is a need in the art, for example, for an optical coupler which can provide improve light transmission between optical fibers as well as facilitate cooling for the optical fibers.

SUMMARY OF THE DISCLOSURE

According to an aspect of the present disclosure, an optical system is provided that includes a conduit fitting, a first connector, a first conduit, a first ferrule and a first nut. The conduit fitting includes a receptacle. The first connector is disposed within the receptacle. The first connector includes a first bore, a first counterbore and a first port radially outboard of the first bore. The first conduit includes a first optics line and a first fluid passage. The first conduit projects longitudinally into the first counterbore and is attached to the first connector. The first optics line projects longitudinally into the first bore. The first fluid passage is fluidly coupled with the first port. The first ferrule circumscribes the first connector. The first nut is threaded onto the conduit fitting and is configured to wedge the first ferrule radially between the first connector and the conduit fitting.

According to another aspect of the present disclosure, another optical system is provided that includes a first conduit, a second conduit and a conduit coupler. The first conduit includes a first optics line and a first fluid passage. The second conduit includes a second optics line and a second fluid passage. The conduit coupler is configured to optically couple the first optics line to the second optics line at an optical interface within the conduit coupler. The conduit coupler is configured to fluidly couple the first fluid passage to the second fluid passage at a fluid interface within the conduit coupler. The conduit coupler includes a conduit fitting, a first nut and a second nut. The first conduit projects longitudinally through a first aperture in the first nut into a receptacle in the conduit fitting. The second conduit projects longitudinally through a second aperture in the second nut into the receptacle in the conduit fitting. The first nut and the second nut are each threaded onto the conduit fitting.

According to still another aspect of the present disclosure, another optical system is provided that includes a first conduit, a second conduit and a conduit coupler. The first conduit includes a first optics line and a first fluid passage. The second conduit includes a second optics line and a second fluid passage. The conduit coupler is configured to optically couple the first optics line to the second optics line at an optical interface within the conduit coupler. The conduit coupler is configured to fluidly couple the first fluid passage to the second fluid passage at a fluid interface within the conduit coupler. The conduit coupler includes a conduit fitting, a first ferrule and a second ferrule. The first ferrule circumscribes the first conduit. The first ferrule secures a first end portion of the first conduit within the conduit fitting. The second ferrule circumscribes the second conduit. The second ferrule secures a second end portion of the second conduit within the conduit fitting.

The first nut may be configured to press the first ferrule longitudinally against the first connector to wedge the first ferrule radially between the first connector and the conduit fitting.

The optical system may also include a first driver circumscribing the first connector. The first driver may be longitudinally engaged with and between the first nut and the first ferrule.

The first nut may be configured to wedge the first driver radially between the first ferrule and the first connector.

The first connector may pass longitudinally through an aperture in an endwall of the first nut.

The first optics line may include one or more optical fibers.

The first optics line may also include a first optical sheath circumscribing and extending longitudinally along the one or more optical fibers. The first optical sheath may project longitudinally into the first bore and/or may be attached to the first connector.

The first fluid passage may circumscribe and may extend longitudinally along the first optics line.

The first conduit may also include a first tube. The first tube may form an outer peripheral boundary of the first fluid passage. The first tube may project longitudinally into the first counterbore and/or may be attached to the first connector. The first optics line may project longitudinally out from the first tube and into the first bore.

The first port may be one of a plurality of first ports in the first connector and fluidly coupled with the first fluid passage.

The optical system may also include a key projecting radially into a first connector groove and a fitting groove. The first connector may also include the first connector groove. The conduit fitting may also include the fitting groove.

The key may be bonded to the conduit fitting.

The conduit fitting may be configured as a conduit union.

The optical system may also include a second optics line. The second optics line may include a plurality of second optical fibers. The first optics line may include a plurality of first optical fibers. Each of the first optical fibers may be optically coupled to a respective one of the second optical fibers at an optical interface between the first optics line and the second optics line.

The optical system may also include a conduit coupler configured to align an end of each of the first optical fibers with an end of the respective one of the second optical fibers. The conduit coupler may include the conduit fitting and the first nut.

Each of the first optical fibers may be coaxial with the respective one of the second optical fibers at the optical interface.

An end of each of the first optical fibers may laterally overlap at least ninety percent of an end of the respective one of the second optical fibers at the optical interface.

The optical system may also include a second fluid passage fluidly coupled with the first fluid passage through the first port.

The optical system may also include a second connector, a second conduit, a second ferrule and a second nut. The second connector may be disposed within the receptacle. The second connector may include a second bore, a second counterbore and a second port radially outboard of the second bore. The second port may be fluidly coupled with the first port. The second conduit may include a second optics line and a second fluid passage. The second conduit may project longitudinally into the second counterbore and may be attached to the second connector. The second optics line may project longitudinally into the second bore and may be optically coupled with the second optics line. The second fluid passage may be fluidly coupled with the second port. The second ferrule may circumscribe the second connector. The second nut may be threaded onto the conduit fitting and may be configured to wedge the second ferrule radially between the second connector and the conduit fitting.

The optical system may also include a key projecting radially into a first connector groove, a second connector groove and a fitting groove. The first connector may also include the first connector groove. The second connector may also include the second connector groove. The conduit fitting may also include the fitting groove.

The optical system may also include an optical probe and a cooling fluid source. The optical probe may be optically coupled with or include the first optics line. The cooling fluid source may be fluidly coupled to the optical probe through the first fluid passage and the first port.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
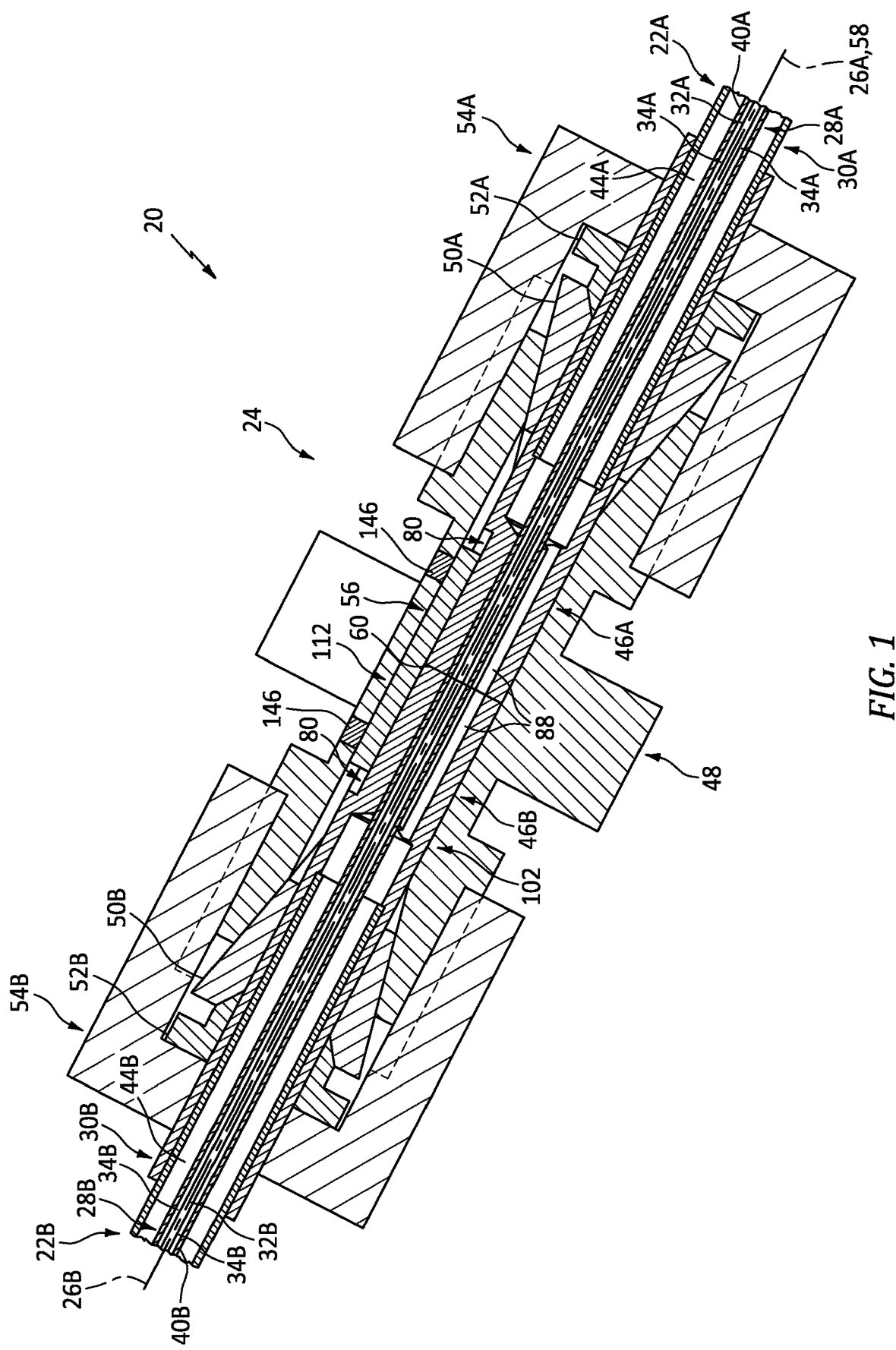
FIG. 1 is a partial sectional illustration of an optical system.

FIG. 1 illustrates a portion of an optical system 20. This optical system 20 includes a first conduit 22A, a second conduit 22B and a conduit coupler 24 configured to removably (e.g., severably) connect the first conduit 22A to the second conduit 22B.

Each of the conduits 22A, 22B (generally referred to as "22") extends longitudinally along a longitudinal centerline 26A, 26B (generally referred to as "26") of the respective conduit to a distal end of the respective conduit 22. Each conduit 22 may be configured as an optical-fluid conduit and/or a fluid-cooled optical conduit. Each conduit 22A, 22B of FIG. 2, for example, includes an optics line 28A, 28B (generally referred to as "28") and a cooling fluid tube 30A, 30B (generally referred to as "30").

Figure 2:
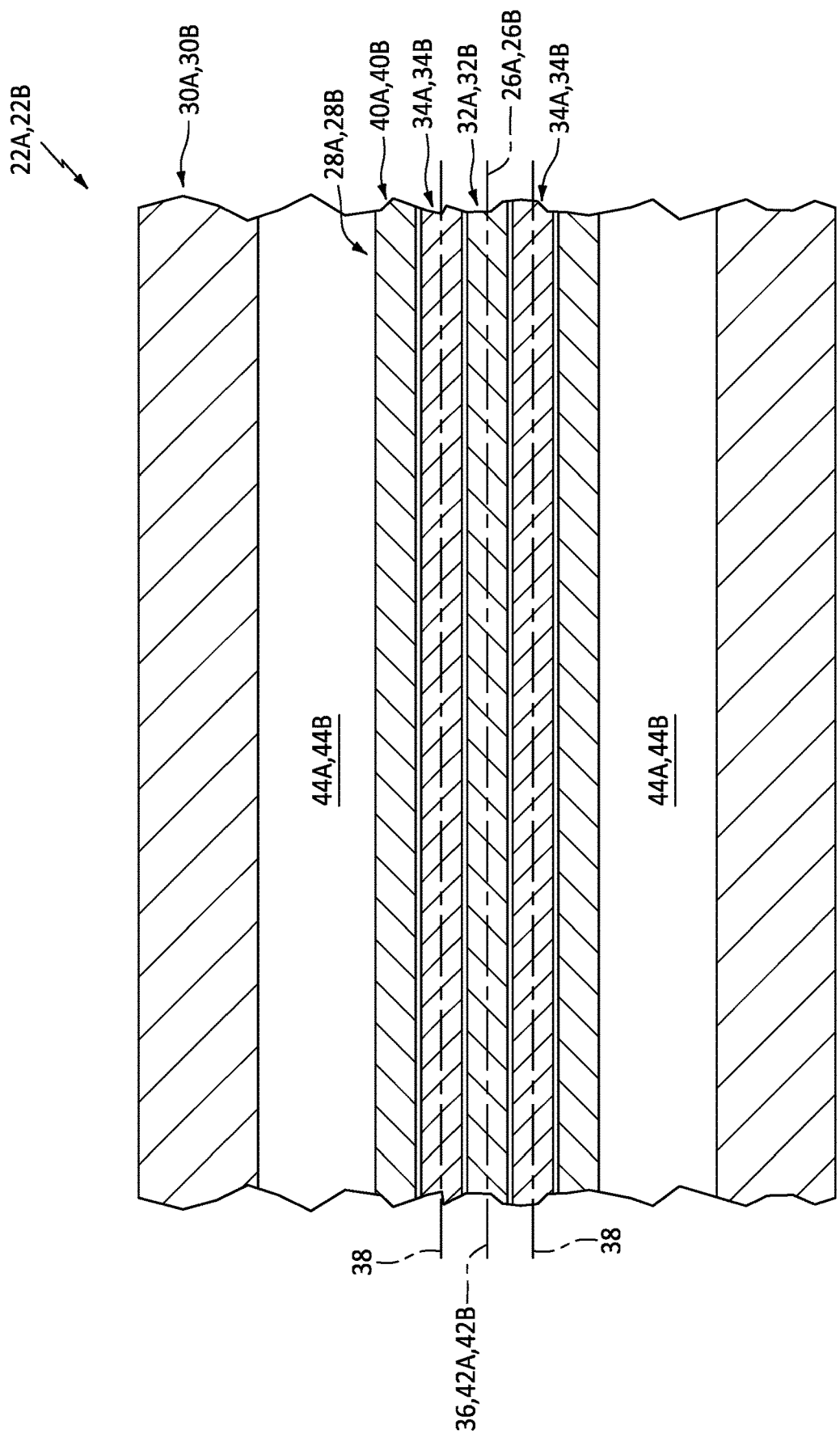
FIG. 2 is a partial sectional illustration of a conduit with optical fibers and a cooling fluid passage.
Figure 3:
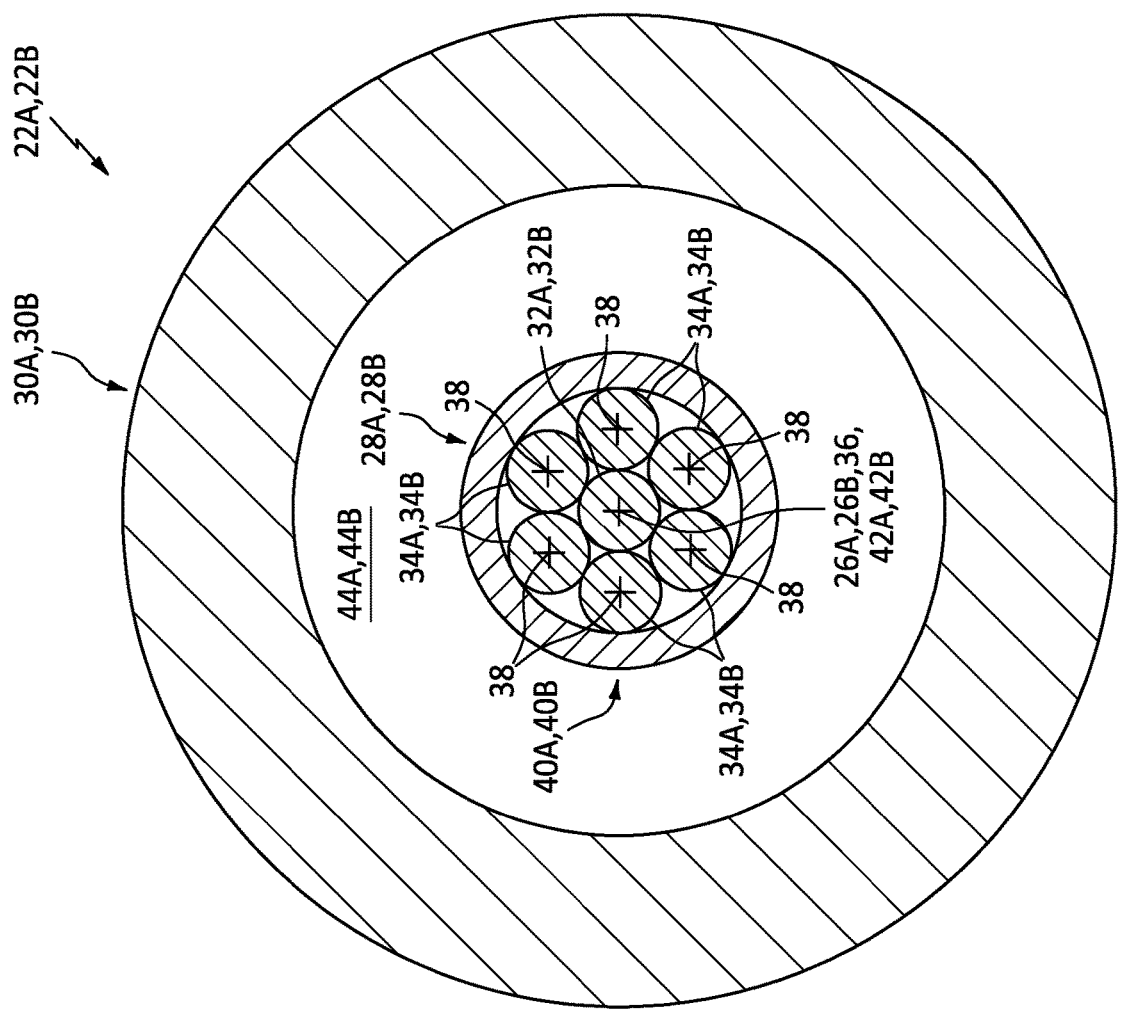
FIG. 3 is a cross-sectional illustration of the conduit.

Referring to FIG. 2, each optics line 28 is configured as a longitudinally extending line (e.g., cable, conduit, etc.) of optical members. The optics line 28A, 28B of FIG. 2, for example, includes a bundle (e.g., a grouping) of multiple optical fibers 32A, 32B (generally referred to as "32") and 34A, 34B (generally referred to as "34"). Referring to FIG. 3, one of the optical fibers 32 may be centrally located within the bundle and referred to as a central optical fiber 32. The remaining optical fibers 34 may be located about a periphery of the central optical fiber 32 and referred to as peripheral optical fibers 34. Referring to FIG. 2, each optics line 28 extends longitudinally along a longitudinal centerline of the respective optics line 28, which line centerline may be parallel with (e.g., coaxial with) the respective conduit centerline 26. Within the optics line 28, each of the optical fibers 32, 34 extends longitudinally along a longitudinal centerline 36, 38 of the respective optical fiber 32, 34. The longitudinal centerline 36 of the central optical fiber 32 may be coaxial with the respective conduit centerline 26. The peripheral optical fibers 34 of FIGS. 2 and 3 extend longitudinally along and are distributed circumferentially about the central optical fiber 32 in a circular array. The longitudinal centerlines 38 of the peripheral optical fibers 34 may be parallel with (but, radially spaced out from) the longitudinal centerline 26, 36. Within the bundle of FIG. 3, the central optical fiber 32 may radially engage (e.g., contact) and/or be positioned radially adjacent each of the peripheral optical fibers 34. Each of the peripheral optical fibers 34 may be disposed circumferentially between and may circumferentially engage a set of circumferentially neighboring (e.g., adjacent) peripheral optical fibers 34. The present disclosure, however, is not limited to the foregoing exemplary arrangement of the optical fibers 32 and 34 within the bundle/the optics line 28. The respective optics line 28, for example, may include multiple of the central optical fibers 32 surrounded by the peripheral optical fibers 34.

Each optics line 28A, 28B may also include an optical sheath 40A, 40B (generally referred to as "40") such as, but not limited to, hypo-tubing, insulative tubing, non-transparent tubing or the like. Referring to FIG. 1, the optical sheath 40 extends longitudinally along at least a portion of the respective optics line 28 external to the conduit coupler 24. The optical sheath 40 may also extend longitudinally along at least a portion or all of the respective optics line 28 internal to the conduit coupler 24. The optical sheath 40 of FIG. 3 extends circumferentially about (e.g., completely around) the bundle of the optical fibers 32 and 34. The optical sheath 40 may thereby circumscribe and completely house, shield, protect and/or otherwise cover a select longitudinal length of the bundle of the optical fibers 32 and 34.

Referring to FIG. 2, the fluid tube 30A, 30B extends longitudinally along a longitudinal centerline 42A, 42B (generally referred to as "42") of the respective fluid tube 30, which tube centerline 42 may be parallel with (e.g., coaxial with) the respective conduit centerline 26. The fluid tube 30 of FIG. 2 is mated with the respective optics line 28. More particularly, the optics line 28 of FIG. 2 is arranged in and extends longitudinally in (e.g., through) the fluid tube 30, where the centerline 26, 36 may be parallel with (e.g., coaxial with) the respective tube centerline 42. Referring to FIG. 3, the fluid tube 30 extends circumferentially around (e.g., circumscribes) the respective optics line 28. A tubular sidewall of the fluid tube 30 is spaced radially outward from the respective optics line 28 forming a cooling fluid passage 44A, 44B (generally referred to as "44") within the respective fluid tube 30, and radially between (a) the respective fluid tube 30 and its sidewall and (b) the respective optics line 28 and its optical sheath 40. This fluid passage 44 extend circumferentially about (e.g., completely around) the respective optics line 28; however, the present disclosure is not limited to such an exemplary arrangement. Referring to FIG. 2, the fluid passage 44 extends longitudinally within the respective fluid tube 30 and longitudinally along (and outside of) the respective optics line 28 and its optical sheath 40.

The conduit coupler 24 of FIG. 1 includes a plurality of conduit connectors 46A, 46B (generally referred to as "46") respective arranged with the conduits 22A and 22B. This conduit coupler 24 includes a conduit fitting 48 (e.g., a conduit union), a plurality of ferrules 50A, 50B (generally referred to as "50"), a plurality of drivers 52A, 52B (generally referred to as "52") and one or more coupler nuts 54A, 54B (generally referred to as "54"), where at least (or only) the conduit fitting 48 and the coupler nuts 54 collectively form a housing structure for an interface between the conduits 22. Briefly, this conduit interface includes an optical interface (e.g., an optical coupling) between (a) the first optics line 28A and its first optical fibers 32A and 34A and (b) the second optics line 28B and its second optical fibers 32B and 34B. The conduit interface also includes a fluid interface (e.g., a fluid coupling) between the (a) the first fluid tube 30A and its first fluid passage 44A and (b) the second fluid tube 30B and its second fluid passage 44B. The conduit coupler 24 may be configured as an indexed conduit coupler for rotationally aligning the first conduit 22A with the second conduit 22B at the conduit interface. The conduit coupler 24 of FIG. 2, for example, also includes a coupler key 56 (e.g., a dowl pin) for mating with the conduit connectors 46 and the conduit fitting 48.

Figure 4:
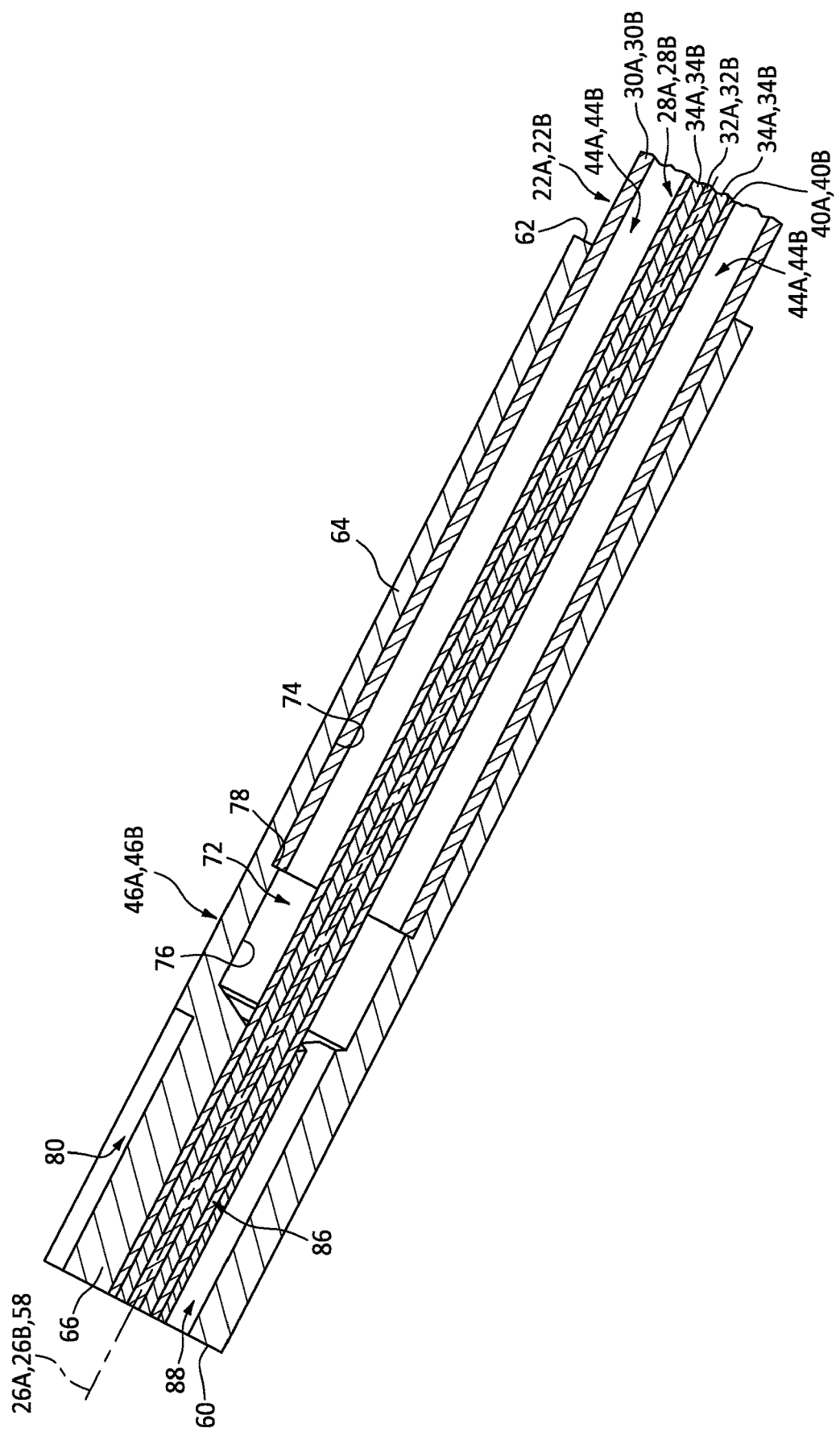
FIG. 4 is a sectional illustration of a conduit connector attached to an end portion of the conduit.

Referring to FIG. 4, each conduit connector 46 extends longitudinally along a longitudinal centerline 58 of the conduit coupler 24 between and to a face end 60 of the respective conduit connector 46 and a base end 62 of the respective conduit connector 46, which coupler centerline 58 may also be a longitudinal centerline of the conduit connector 46 and/or parallel with (e.g., coaxial with) the respective conduit centerline 26. Each conduit connector 46 includes a connector sidewall 64 and a connector endwall 66.

Figure 5:
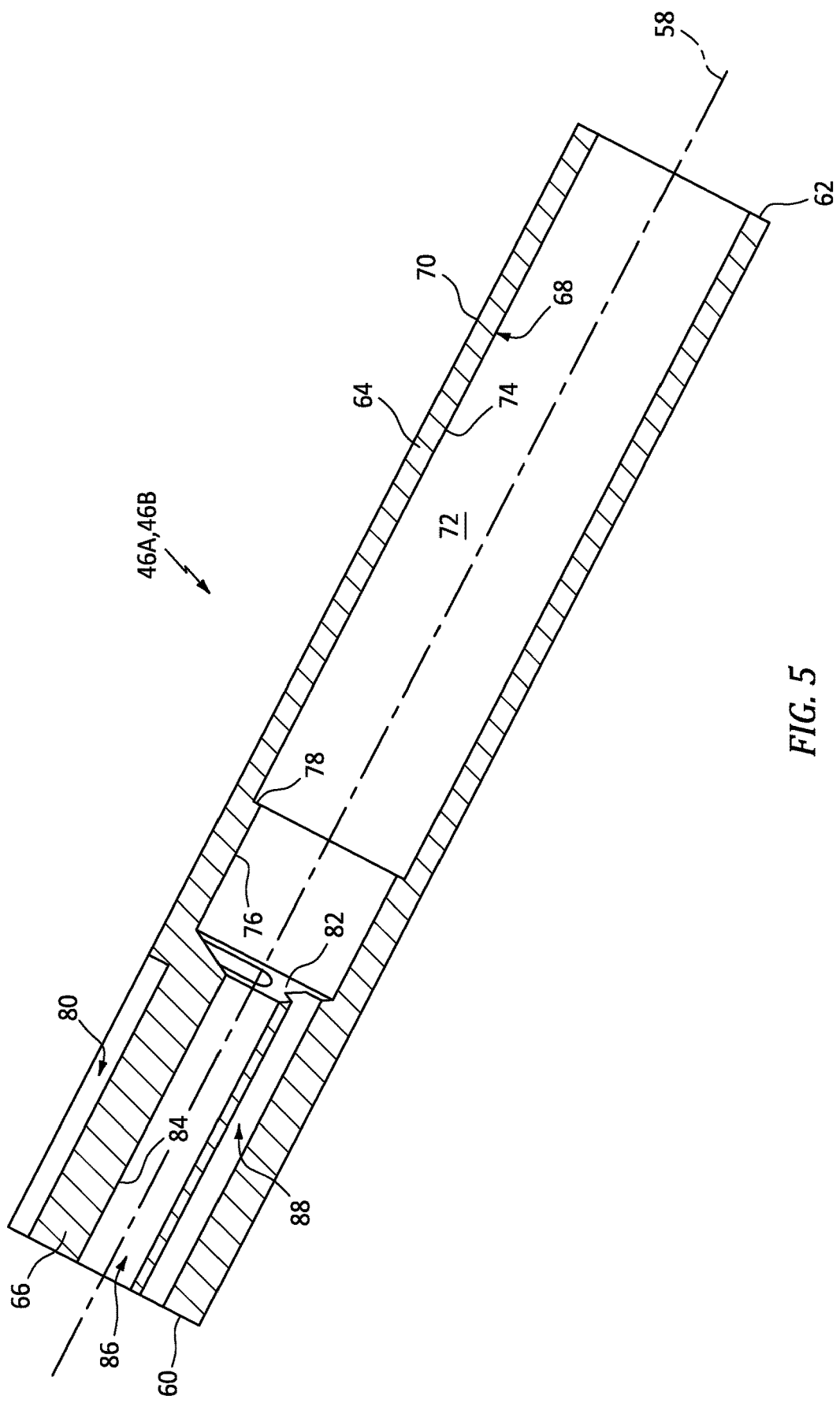
FIG. 5 is a sectional illustration of the conduit connector.

Referring to FIG. 5, the connector sidewall 64 extends longitudinally along the coupler centerline 58 from the connector face end 60 to the connector base end 62. The connector sidewall 64 extends radially between and to an inner side 68 of the connector sidewall 64 and an outer side 70 of the respective conduit connector 46. The connector sidewall 64 extends circumferentially around (e.g., circumscribes) the coupler centerline 58 providing the connector sidewall 64 with a full-hoop tubular geometry. With this arrangement, the connector sidewall 64 forms a radial outer periphery of a counterbore 72 within the respective conduit connector 46. This counterbore 72 projects longitudinally along the coupler centerline 58 into the respective conduit connector 46 from the connector base end 62 to the connector endwall 66. The counterbore 72 projects radially out from the coupler centerline 58 to the connector sidewall inner side 68. This counterbore 72 is configured as a receptacle for an end portion of the respective fluid tube 30 (see FIG. 4) as described below in further detail.

The inner side 68 of the connector sidewall 64 may have a stepped geometry. The connector sidewall 64 of FIG. 5, for example, includes a (e.g., cylindrical) first inner surface 74, a (e.g., cylindrical) second inner surface 76 and a (e.g., annular) shoulder surface 78, where the connector surfaces 74, 76, 78 may collectively form the connector sidewall inner side 68. The first inner surface 74 of FIG. 5 extends longitudinally along the coupler centerline 58 from the connector base end 62 to an outer end of the shoulder surface 78. The second inner surface 76 of FIG. 5 extends longitudinally along the coupler centerline 58 from the connector endwall 66 to an inner end of the shoulder surface 78. The shoulder surface 78 extends radially between and to the first inner surface 74 and the second inner surface 76.

Figure 6:
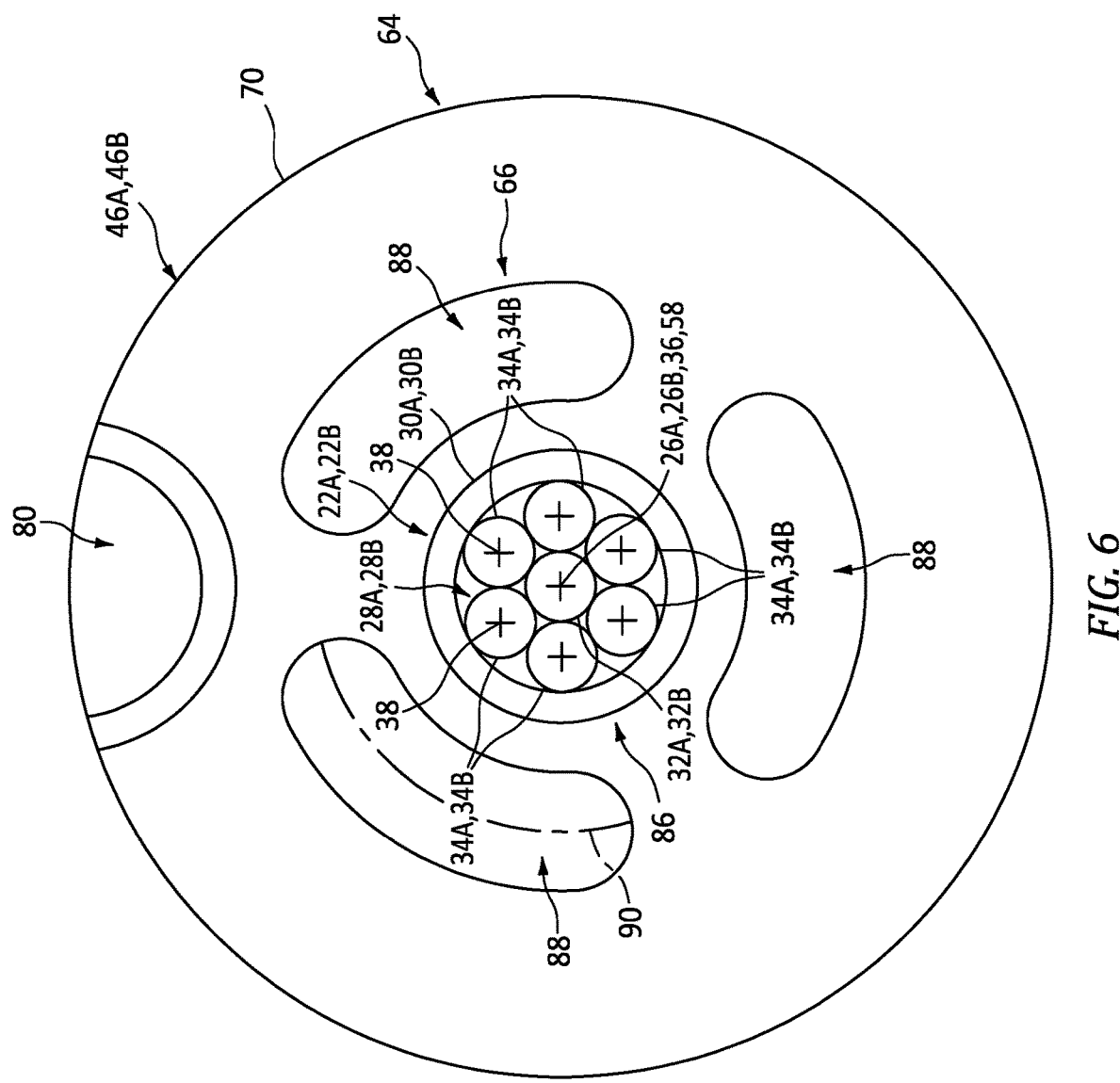
FIG. 6 is an end view illustration of the conduit connector.

The connector sidewall 64 of FIG. 5 also includes a (e.g., single) connector groove 80. This connector groove 80 projects longitudinally along the coupler centerline 58 into the connector sidewall 64 from the connector face end 60 to a longitudinal end of the connector groove 80. Referring to FIG. 6, the connector groove 80 extends laterally (e.g., circumferentially) within the connector sidewall 64 between and to opposing lateral sides of the connector groove 80. The connector groove 80 projects radially into the connector sidewall 64 from the connector outer side 70 to a radial inner end of the connector groove 80. The connector groove 80 has a cross-sectional geometry when viewed in a reference plane perpendicular to the coupler centerline 58; e.g., the plane of FIG. 6. This cross-sectional geometry may have a partial circular (e.g., half circle, third circle, etc.) shape; however, the present disclosure is not limited to such an exemplary arrangement.

Referring to FIG. 5, the connector endwall 66 is arranged at (e.g., on, adjacent or proximate) the connector face end 60. The connector endwall 66 of FIG. 5, for example, extends longitudinally along the coupler centerline 58 from a (e.g., frustoconical) surface 82 forming a longitudinal end of the counterbore 72 to the connector face end 60. The connector endwall 66 projects radially inward from the connector sidewall 64, towards the coupler centerline 58, to an inner side 84 of the connector endwall 66. The connector endwall 66 extends circumferentially around (e.g., circumscribes) the coupler centerline 58 providing the connector endwall 66 with a full-hoop tubular/annular geometry. With this arrangement, the connector endwall 66 forms a radial outer periphery of a bore 86 within the respective conduit connector 46. This bore 86 projects longitudinally along the coupler centerline 58 into the respective conduit connector 46 and its connector endwall 66 from the connector face end 60 to the endwall surface 82 and the counterbore 72. The bore 86 projects radially out from the coupler centerline 58 to the connector endwall inner side 84. This bore 86 is configured as a receptacle for an end portion of the respective optics line 28 (see FIG. 4) as described below in further detail.

The connector endwall 66 of FIG. 6 also includes one or more cooling fluid ports 88. These ports 88 are radially outboard of the bore 86 and, thus, the respective optics line 28 received within the bore 86. The ports 88 are arranged circumferentially about the coupler centerline 58, the bore 86 and/or the respective optics line 28 in an array; e.g., a circular array. Each port 88 of FIG. 6 extends laterally (e.g., circumferentially) within the connector endwall 66 along a lateral centerline 90 (e.g., major axis centerline) of the respective port 88 between opposing lateral sides of the port 88. This lateral centerline 90 may be curved; e.g., arcuate with a uniform radius to the coupler centerline 58. Each port 88 extends radially within the connector endwall 66 (e.g., along a minor axis centerline) between opposing radial sides of the port 88. A lateral width of each port 88 may be greater than a radial height of that port 88 providing the port 88 with an elongated cross-sectional geometry; e.g., each port 88 may be a slot. Furthermore, a lateral distance between laterally adjacent ports 88 may be sized smaller than the lateral width. The present disclosure, however, is not limited to such an exemplary arrangement. Referring to FIG. 5, each port 88 extends longitudinally along the coupler centerline 58 through the connector endwall 66 from the endwall surface 82 and the counterbore 72 to the connector face end 60.

Referring to FIG. 4, each optics line 28 and its optical fibers 32 and 34 are mated with the respective conduit connector 46. The end portion of each optics line 28, for example, may be inserted into the respective conduit connector 46. More particularly, the end portion of each optics line 28 is inserted longitudinally into the respective bore 86, where an end of the optical sheath 40 and/or ends of the optical fibers 32 and 34 are disposed at and may be longitudinally aligned with the respective connector face end 60. Alternatively, the end of the optical sheath 40 and/or the ends of the optical fibers 32 and 34 may project (e.g., slightly) longitudinally out from the respective connector face end 60. The optical fibers 32 and 34 may be fixed (e.g., bonded) to the optical sheath 40, and the optical sheath 40 may be fixed (e.g., bonded) to the respective conduit connector 46 and its connector endwall 66.

Referring to FIG. 6, the optics line 28 and its optical fibers 32 and 34 may be arranged with the respective conduit connector 46 in a select manner; e.g., a known, predetermined manner. More particularly, the optical fibers 32 and 34 may be rotationally clocked about the longitudinal centerline 26, 36, 58 in the select manner. A circumferential center of the connector groove 80 of FIG. 6, for example, may be circumferentially aligned with (e.g., located on a common ray out from the longitudinal centerline 26, 36, 58 as) a point of engagement between (or a gap) between a circumferentially neighboring (e.g., adjacent) pair of the optical fibers 34. Alternatively, the circumferential center of the connector groove 80 may be circumferentially aligned with the longitudinal centerline 38 of one of the optical fibers 34. The present disclosure, however, is not limited to the foregoing exemplary arrangements. While the specific arrangement of the optical fibers 32 and 34 may vary and the relative location of those optical fibers 32 and 34 relative to the conduit connector 46 may vary, these arrangements in general should be the same for each set of optical fibers 32 and 34 and its associated conduit connector 46. In other words, the arrangement of the first optical fibers 32A and 34A and the first connector 46A in general should match (e.g., be the same as) and/or otherwise compliment (e.g., mirror, etc.) the arrangement of the second optical fibers 32B and 34B and the second connector 46B.

Referring to FIG. 4, each fluid tube 30 is also mated with the respective conduit connector 46. The end portion of each fluid tube 30, for example, may be inserted into the respective conduit connector 46. More particularly, the end portion of each fluid tube 30 is inserted longitudinally into the respective counterbore 72, where an end of the fluid tube 30 is longitudinally adjacent and may engage (e.g., abut against) the respective shoulder surface 78. The fluid tube 30 may be fixed (e.g., bonded) to the respective conduit connector 46 and its connector sidewall 64. With this arrangement, each fluid passage 44 may be fluidly coupled with the respective ports 88 through a portion of the respective counterbore 72 longitudinally between the respective fluid tube 30 and the respective connector endwall 66.

Figure 7:
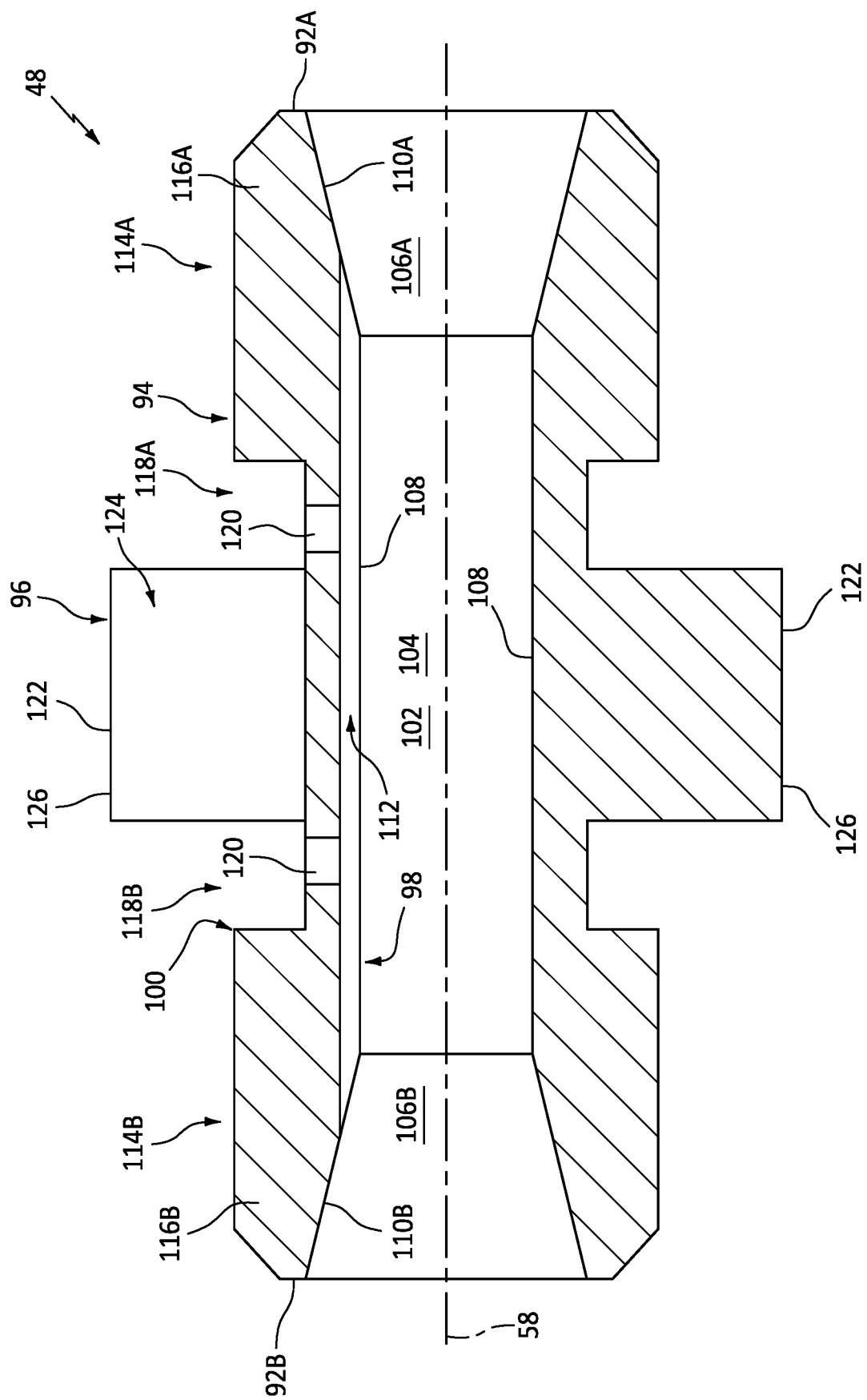
FIG. 7 is a sectional illustration of a conduit fitting.

Referring to FIG. 7, the conduit fitting 48 extends longitudinally along the coupler centerline 58 between and to opposing longitudinal ends 92A, 92B (generally referred to as "92") of the conduit fitting 48, which coupler centerline 58 may also be a longitudinal centerline of the conduit fitting 48. The conduit fitting 48 of FIG. 7 includes a fitting sidewall 94 and a fitting grip 96 (e.g., a wrenching feature).

The fitting sidewall 94 extends longitudinally along the coupler centerline 58 between and to the fitting ends 92. The fitting sidewall 94 extends radially between and to an inner side 98 of the fitting sidewall 94 and an outer side 100 of the fitting sidewall 94. The fitting sidewall 94 extends circumferentially around (e.g., circumscribes) the coupler centerline 58 providing the fitting sidewall 94 with a full-hoop tubular geometry. With this arrangement, the fitting sidewall 94 forms a radial outer periphery of a connector receptacle 102 within the respective conduit fitting 48. This connector receptacle 102 extends longitudinally along the coupler centerline 58 through the respective conduit fitting 48 between and to the fitting ends 92. The connector receptacle 102 projects radially out from the coupler centerline 58 to the fitting sidewall inner side 98. This connector receptacle 102 is configured to at least partially receive the conduit connectors 46 (see FIG. 1) as described below in further detail.

The connector receptacle 102 of FIG. 7 includes an intermediate portion 104 and a pair of opposing end portions 106A and 106B (generally referred to as "106"). The receptacle intermediate portion 104 extends longitudinally within the conduit fitting 48 between and to the receptacle end portions 106. The receptacle intermediate portion 104 may have a uniform size (e.g., diameter) along its longitudinal length. With this arrangement, a radial outer periphery of each receptacle intermediate portion 104 may be formed by a uniform inner (e.g., cylindrical) surface 108 of the fitting sidewall 94 at its fitting sidewall inner side 98. Each receptacle end portion 106 projects longitudinally into the conduit fitting 48 from the respective fitting end 92 to the receptacle intermediate portion 104. One or each of the receptacle end portions 106 may have a variable size (e.g., diameter) along its longitudinal length. Each receptacle end portion 106 of FIG. 7, for example, (e.g., continuously) radially tapers towards the coupler centerline 58 as that receptacle end portion 106 extends longitudinally from (or about) the respective fitting end 92 to (or about) the receptacle intermediate portion 104. With this arrangement, a radial outer periphery of each receptacle end portion 106 may be formed by an inner tapering (e.g., frustoconical) surface 110A, 110B (generally referred to as "110") of the fitting sidewall 94 at its fitting sidewall inner side 98.

Figure 8:
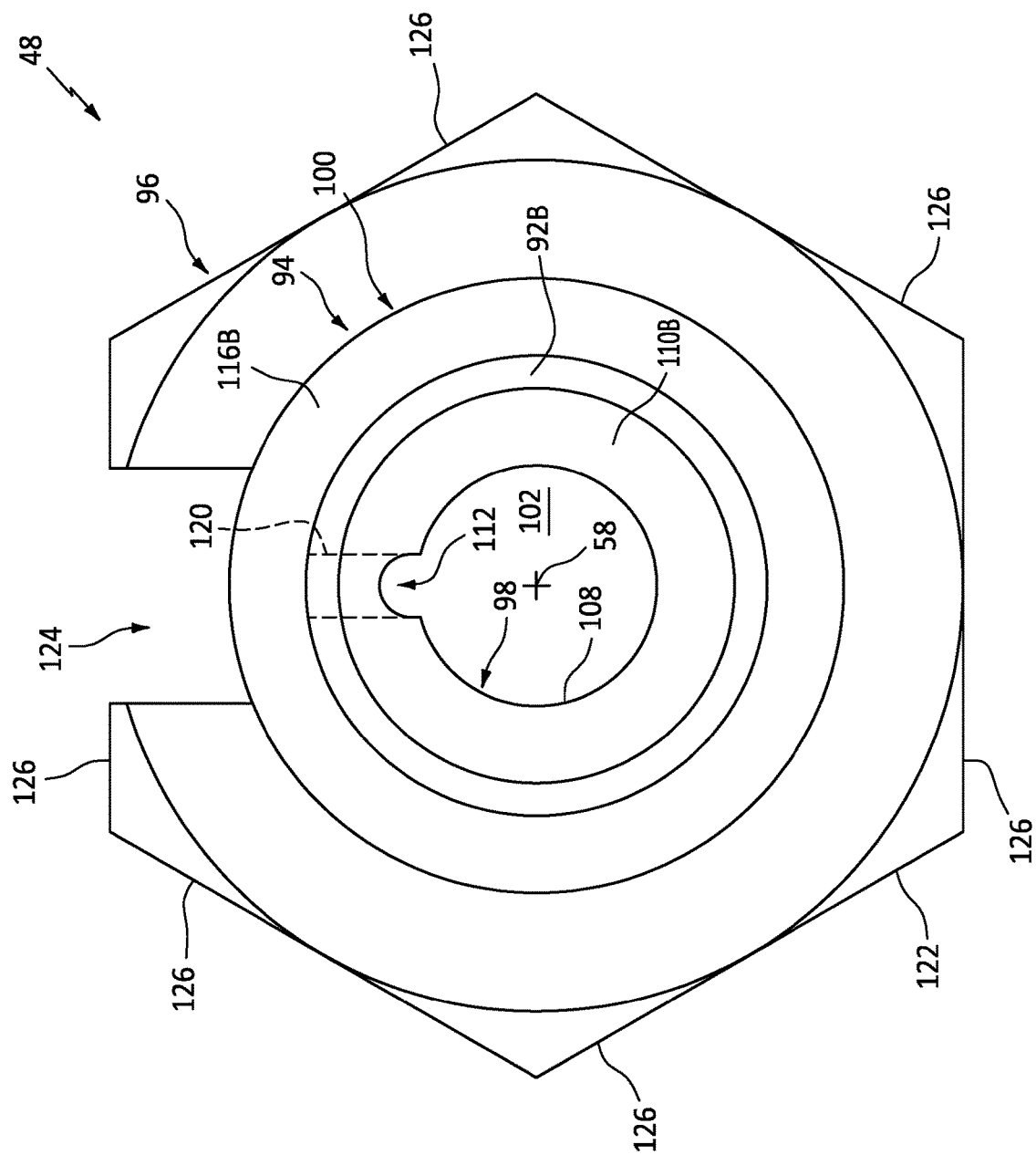
FIG. 8 is an end view illustration of the conduit fitting.

At the fitting sidewall inner side 98, the fitting sidewall 94 includes a (e.g., single) fitting groove 112. This fitting groove 112 extends longitudinally along the coupler centerline 58 through the fitting sidewall 94 between the fitting sidewall surfaces 110A and 110B. Referring to FIG. 8, the fitting groove 112 extends laterally (e.g., circumferentially) within the fitting sidewall 94 between and to opposing lateral sides of the fitting groove 112. The fitting groove 112 projects radially into the fitting sidewall 94 from the fitting sidewall inner side 98 to a radial outer end of the fitting groove 112. The fitting groove 112 has a cross-sectional geometry when viewed in a reference plane perpendicular to the coupler centerline 58; e.g., the plane of FIG. 8. This cross-sectional geometry may have a partial circular (e.g., half circle, third circle, etc.) shape; however, the present disclosure is not limited to such an exemplary arrangement.

Referring to FIG. 7, at the fitting sidewall outer side 100, opposing longitudinal end sections 114A and 114B (generally referred to as "114") of the fitting sidewall 94 may be threaded. Each sidewall end section 114 of FIG. 1, for example, includes external threads 116A, 116B (generally referred to as "116") (schematically shown). These external threads 116 may be longitudinally separated from the fitting grip 96 by longitudinal (e.g., annular) gaps 118A and 118B (generally referred to as "118"). In each gap 118, the fitting sidewall 94 may include a bonding port 120. Each bonding port 120 projects radially through the fitting sidewall 94 to the fitting groove 112. Although these bonding ports 120 are open before assembly of the optical system 20, each bonding port 120 may be plugged following optical system assembly as described below in further detail.

The fitting grip 96 may be arranged at an intermediate (e.g., center) location longitudinally along the fitting sidewall 94. The fitting grip 96 projects radially out from the fitting sidewall 94 at the fitting sidewall outer side 100 to a radial outer distal end 122 of the fitting grip 96. The fitting grip 96 extends longitudinally between and to opposing longitudinal sides of the fitting grip 96, where each grip side may be longitudinally spaced form the respective external threads 116. Referring to FIG. 8, the fitting grip 96 extends circumferentially about (e.g., partially around) the coupler centerline 58 and the fitting sidewall 94. Referring to FIG. 7, an access channel 124 extends longitudinally through the fitting grip 96. This access channel 124 is aligned with the bonding ports 120 to provide access to the bonding ports 120; however, it is contemplated this access channel 124 may be omitted in other embodiments and the fitting grip 96 may extend completely around the fitting sidewall 94. At the grip distal end 122, the fitting grip 96 of FIG. 8 may be configured with a plurality of flats 126. With this arrangement, the fitting grip 96 may be configured as a wrenching feature which can be gripped by a tool such as a wrench.

Figure 9:
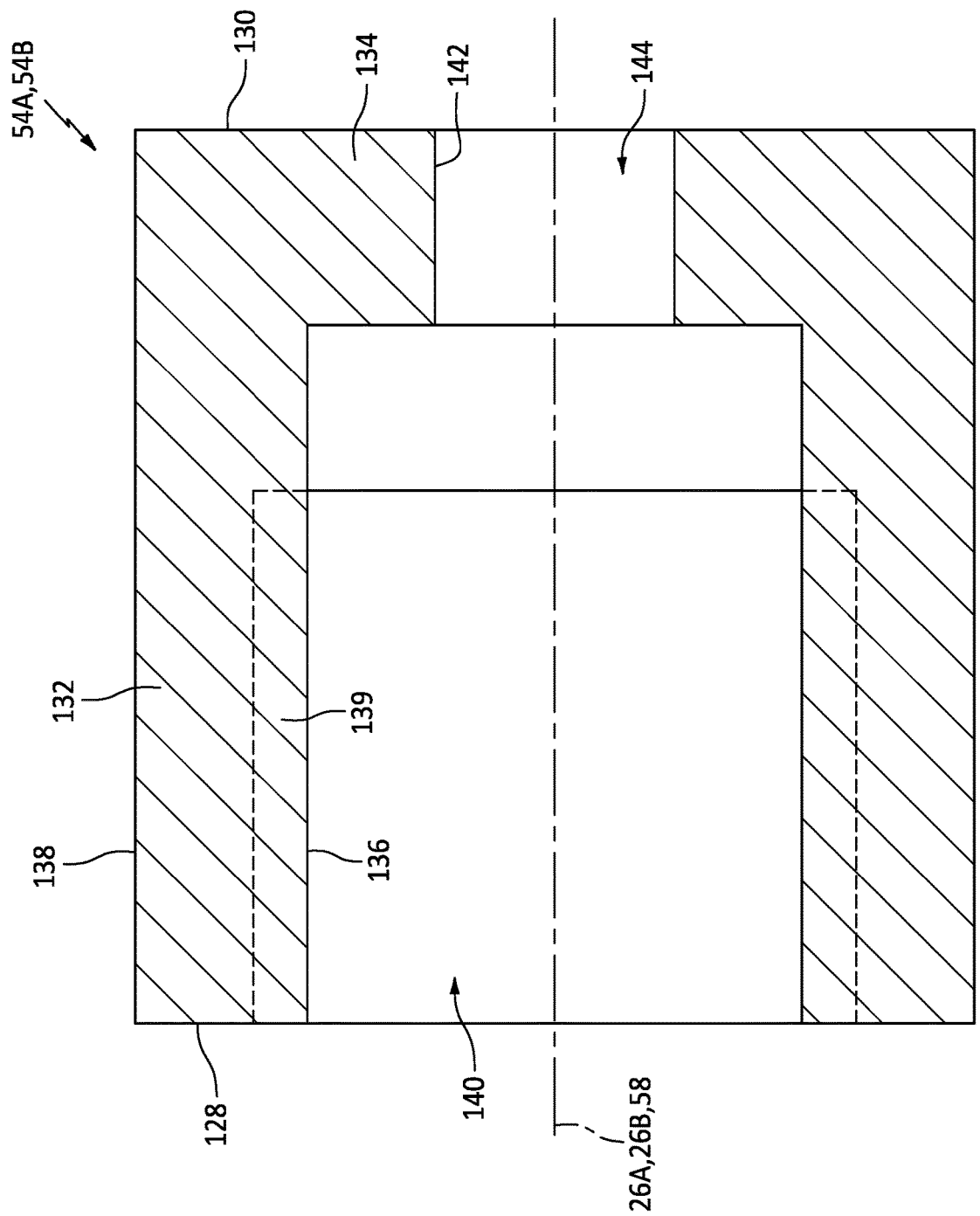
FIG. 9 is a sectional illustration of a coupler nut.

Referring to FIG. 9, each coupler nut 54 extends longitudinally along the coupler centerline 58 between and to a first end 128 (e.g., a mating end) of the coupler nut 54 and a second end 130 (e.g., a back end) of the coupler nut 54. Each coupler nut 54 includes a nut sidewall 132 and a nut endwall 134.

The nut sidewall 132 extends longitudinally along the coupler centerline 58 between and to the nut first end 128 and the nut second end 130. The nut sidewall 132 extends radially between and to an inner side 136 of the nut sidewall 132 and an outer side 138 of the coupler nut 54. At least a portion of the nut sidewall 132 may be threaded, where internal threads 139 (schematically shown) are disposed at the nut sidewall inner side 136. The nut sidewall 132 extends circumferentially around (e.g., circumscribes) the coupler centerline 58 and the nut endwall 134 providing the nut sidewall 132 with a full-hoop tubular geometry. With this arrangement, the nut sidewall 132 forms an outer periphery of a fitting receptacle 140 within the respective coupler nut 54. This fitting receptacle 140 projects longitudinally along the coupler centerline 58 into the respective coupler nut 54 from the nut first end 128 to the nut endwall 134. The fitting receptacle 140 projects radially out from the coupler centerline 58 to the nut sidewall inner side 136. This fitting receptacle 140 is configured to receive the conduit fitting 48 (see FIG. 10) as described below in further detail.

The nut endwall 134 is disposed at the nut second end 130. The nut endwall 134 of FIG. 9, for example, extends longitudinally from the fitting receptacle 140 to the nut second end 130. The nut endwall 134 projects radially inward from the nut sidewall 132 to an inner side 142 of the nut endwall 134. The nut endwall 134 extends circumferentially around (e.g., circumscribes) the coupler centerline 58 providing the nut endwall 134 with an annular geometry. With this arrangement, the nut endwall 134 is configured with an aperture 144; e.g., a bore, a through-hole, etc. The endwall aperture 144 projects longitudinally through the nut endwall 134 to the fitting receptacle 140.

Figure 10:
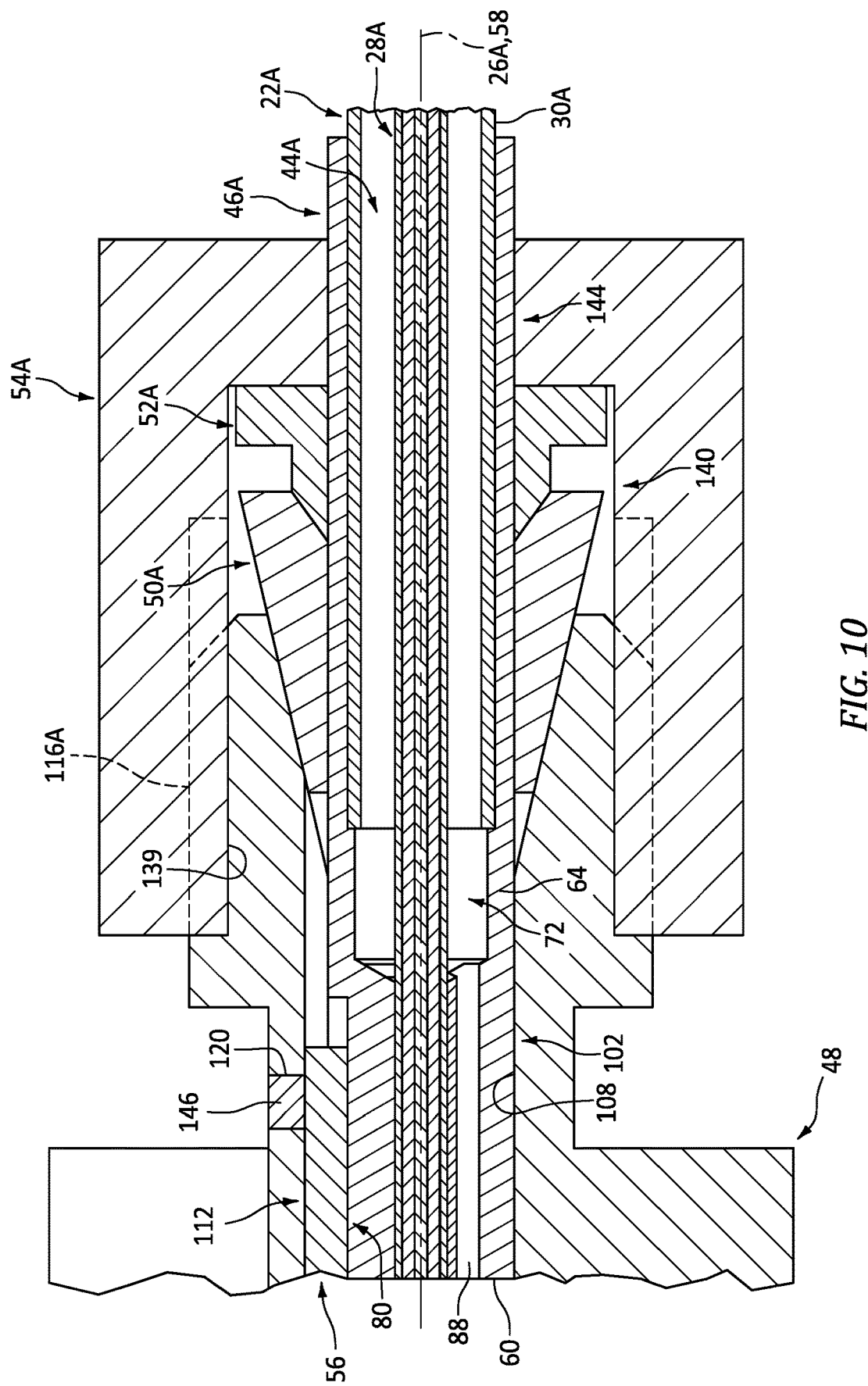
FIG. 10 is a sectional illustration of a portion of the optical system adjacent a conduit interface.

Referring to FIG. 10, during assembly of the optical system 20, each ferrule 50 and each driver 52 is mated with a respective one of the conduit connectors 46. Each conduit connector 46, for example, may be inserted into a bore of the respective driver 52 and a bore of the respective ferrule 50. Each ferrule 50 and each driver 52 thereby circumscribes, radially engages (e.g., contacts) and may be longitudinally slidable along the respective conduit connector 46. Each ferrule 50 is arranged longitudinally between the respective driver 52 and the connector face end 60.

The coupler key 56 is mated with the conduit fitting 48. The coupler key 56, for example, is disposed in the fitting groove 112. The coupler key 56 longitudinally overlaps each bonding port 120. Bonding material 146 (e.g., weld, braze, etc.) may thereby be disposed into the bonding port 120 to bond (e.g., weld, braze, etc.) the coupler key 56 to the conduit fitting 48. This bonding may also be used to plug each bonding port 120 such that, for example, fluid cannot leak out of the conduit fitting 48 through the respective bonding port 120.

Each conduit connector 46 with its attached conduit 22 is mated with the conduit fitting 48. Each conduit connector 46, for example, may be inserted into a respective side of the connector receptacle 102 until, for example, that conduit connector 46 longitudinally engages the other conduit connector 46 (see FIG. 1) and/or the connector face end 60 is located as a predetermined intermediate (e.g., center) location along the conduit fitting 48. In addition, each conduit connector 46 is arranged (e.g., rotationally clocked) such that the coupler key 56 is mated with the respective connector groove 80. The coupler key 56 may thereby project radially into both the fitting groove 112 and each connector groove 80 and rotationally lock each conduit connector 46 within the conduit fitting 48. Each conduit connector 46 and its connector sidewall 64 may also radially engage (e.g., contact) the conduit fitting 48 and its surface 108.

Each conduit connector 46 is mated with a respective one of the coupler nuts 54. Each conduit connector 46, for example, project longitudinally through the nut endwall aperture 144. Each coupler nut 54 may then be mated with the conduit fitting 48, where the respective ferrule 50 and the respective driver 52 are arranged sequentially longitudinally between the conduit fitting 48 and the respective coupler nut 54. Each coupler nut 54, for example, may be threaded onto the conduit fitting 48 to mate its internal threads 139 with the respective external threads 116 of the conduit fitting 48. As each coupler nut 54 is threaded, that coupler nut 54 may press the respective driver 52 longitudinally against the respective ferrule 50. In turn, the respective driver 52 may press the respective ferrule 50 longitudinally against the conduit fitting 48 as well as radially against and in between the conduit fitting 48 and the respective conduit connector 46. A tapered portion of each ferrule 50 may thereby be wedged radially between the conduit fitting 48 and the respective conduit connector 46. This wedging may longitudinally and rotationally fix the respective conduit connector 46 to the conduit fitting 48. The wedging may also fluidly seal an annular space between the respective conduit connector 46 to the conduit fitting 48. With this arrangement, referring to FIG. 1, the conduit coupler 24 may optically couple the optics lines 28 together as well as fluidly couple the fluid passages 44 together through the ports 88.

Figure 11:
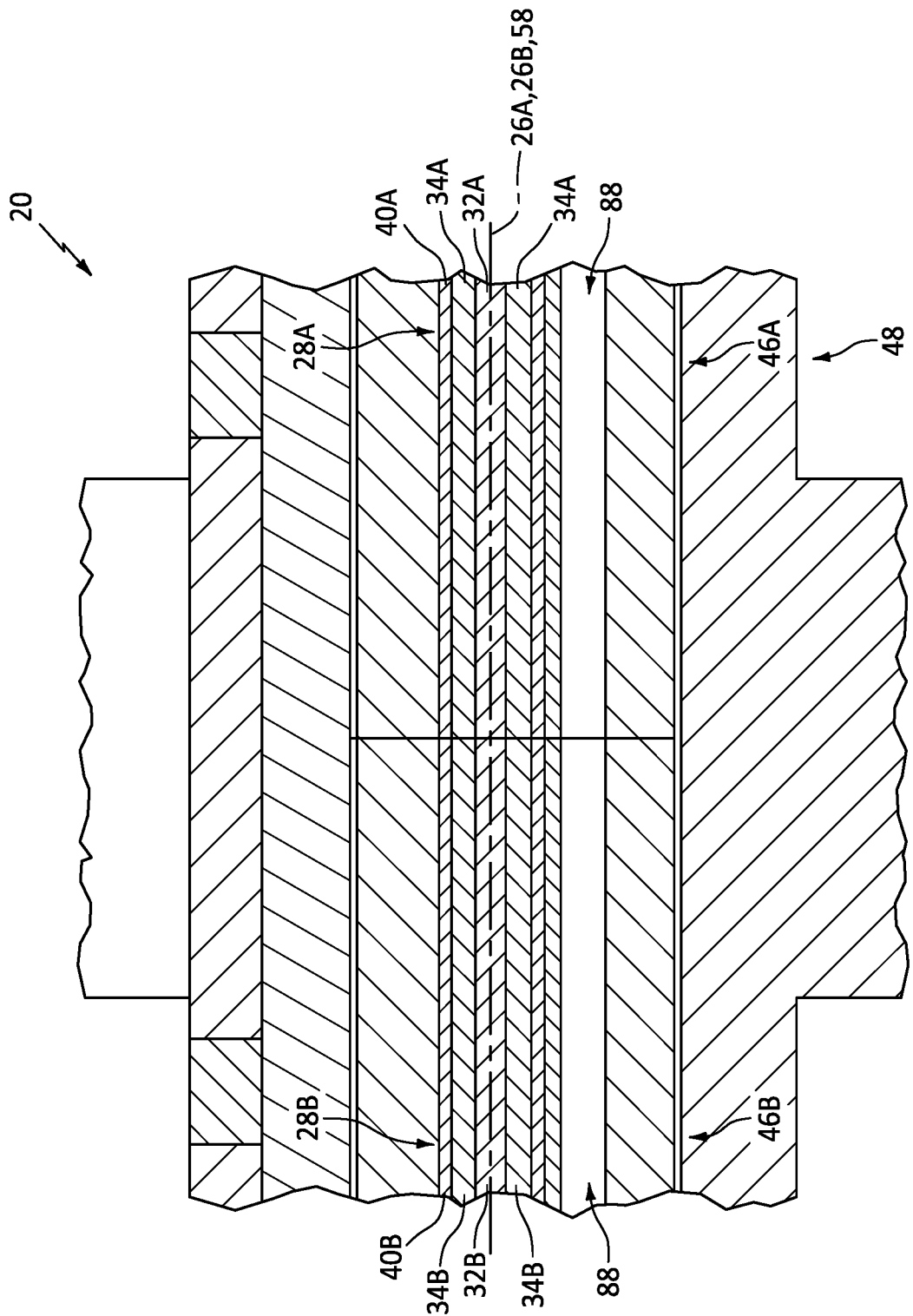
FIG. 11 is a sectional illustration of another portion of the optical system at the conduit interface.
Figure 12:
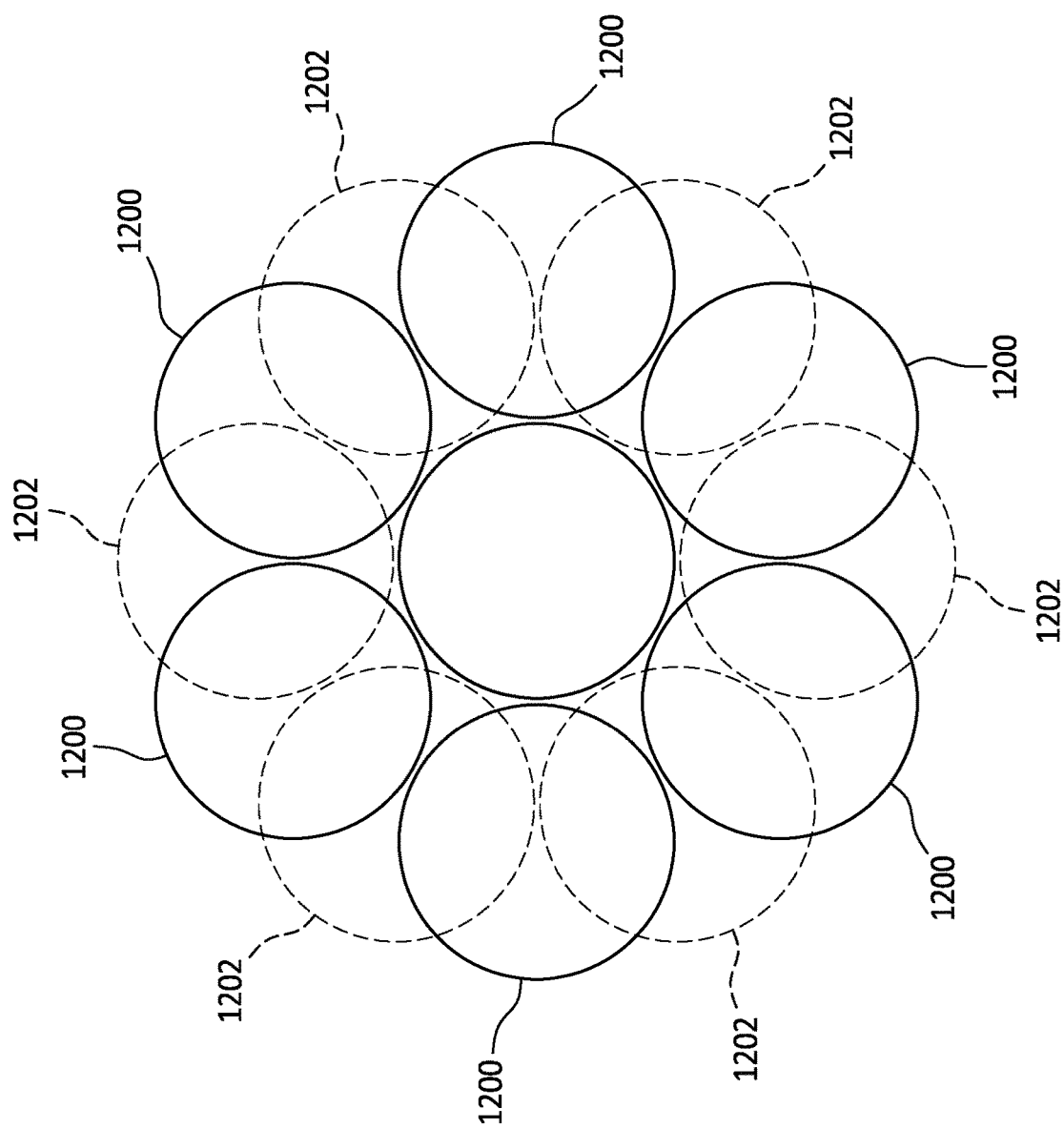
FIG. 12 is a schematic illustration depicting misalignment between optical fibers.

Referring to FIG. 11, following assembly of the optical system 20, each first optical fiber 32A, 34A of the first optics line 28A may be aligned with a respective one of the second optical fibers 32B and 34B of the second optics line 28B. For example, each first optical fiber 32A, 34A and its longitudinal centerline may be substantially or completely coaxial with the respective second optical fiber 32B, 34B and its longitudinal centerline. With such an arrangement, the end of each first optical fiber 32A, 34A laterally (e.g., radially and/or circumferentially) overlaps at least ninety percent (90%) or ninety-five percent (95%) of the end of the respective second optical fiber 32B, 34B. Where a set of the optical fibers 32 and 34 are completely aligned, the end of each first optical fiber 32A, 34A may completely (e.g., 100%) laterally overlap the end of the respective second optical fiber 32B, 34B, and vice versa. The alignment between the first optical fibers 32A and 34A and the second optical fibers 32B and 34B may promote enhance light transmission between the first optical fibers 32A and 34A and the second optical fibers 32B and 34B. For example, at least sixty, seventy or even eighty percent (60%, 70% or 80%) of light may be transmitted between a respective set of the optical fibers 32 and 34. By contrast, referring to FIG. 12, where first optical fibers 1200 are (e.g., circumferentially) misaligned from second optical fibers 1202, less than forty or thirty percent (40-30%) of light may be transferred.

Referring to FIG. 11, the conduit connectors 46 and their ports 88 are arranged to fluidly couple the fluid tubes 30 and their fluid passages 44 together through the conduit coupler 24. In particular, each port 88 of the first connector 46A may be aligned with a respective one of the ports 88 of the second connector 46B. For example, each port 88 of the first connector 46A and its longitudinal centerline may be substantially or completely coaxial with the respective port 88 of the second connector 46B and its longitudinal centerline. With such an arrangement, each port 88 of the first connector 46A laterally (e.g., radially and/or circumferentially) overlaps at least ninety percent (90%) or ninety-five percent (95%) of the respective port 88 of the second connector 46B. Where a set of the ports 88 are completely aligned, each port 88 of the first connector 46A may completely (e.g., 100%) laterally overlap the respective port 88 of the second connector 46B, and vice versa. The alignment between the ports 88 of the first connector 46A and the ports 88 of the second connector 46B may promote enhance fluid transmission between the fluid passages 44 at the fluid interface.

The conduit coupler 24 is described above as an indexed conduit coupler which rotationally aligns the first conduit 22A to the second conduit 22B at the conduit interface. It is contemplated, however, the conduit coupler 24 may be implemented without requiring such alignment. The conduit coupler 24, for example, may be configured without the coupler key 56.

The conduit coupler 24 of FIG. 1 may be used for various applications. The optical system 20, for example, may be used for communicating information (e.g., light signals) between various devices; e.g., from a signal transmitter to a signal receiver, between transceivers, etc. The optical system 20 may also or alternatively be used for measuring one or more parameters. The optical system 20 of FIG. 13, for example, is configured for measuring one or more operational parameters of a rotor 148. This rotor 148 may be a bladed rotor 150 for a gas turbine engine 152. Examples of the bladed rotor 150 include, but are not limited to, a propulsor rotor (e.g., a fan rotor), a compressor rotor or any other ducted rotor within and/or rotatably driven by the gas turbine engine 152. The present disclosure, however, is not limited to measuring operational parameters for a bladed rotor, nor to measuring operational parameters for gas turbine engine applications. The optical system 20 (here, a measurement system), for example, may alternatively be configured to measure one or more operational parameters of any rotor in or coupled to various other types of rotational equipment such as, but not limited to, a reciprocating piston engine, a rotary engine, an electric motor and the like. However, for ease of description, the optical system 20 is described below with reference to the bladed rotor 150.

The operation parameters may include a blade time of arrival (BTOA) for one or more rotor blades 154 of the bladed rotor 150. The blade time of arrival may be indicative of a point in time when a tip 156 (or another portion) of one of the rotor blades 154 arrives at or crosses (e.g., passes) a measurement location; e.g., a probe location. The present disclosure, however, is not limited to such exemplary operational parameters. The operational parameters, for example, may also or alternatively include a blade tip clearance (BTC). The blade tip clearance may be indicative of a (e.g., minimum or average) radial distance between the tip 156 of one of the rotor blades 154 and a duct wall 158 circumscribing and housing the bladed rotor 150.

Figure 13:
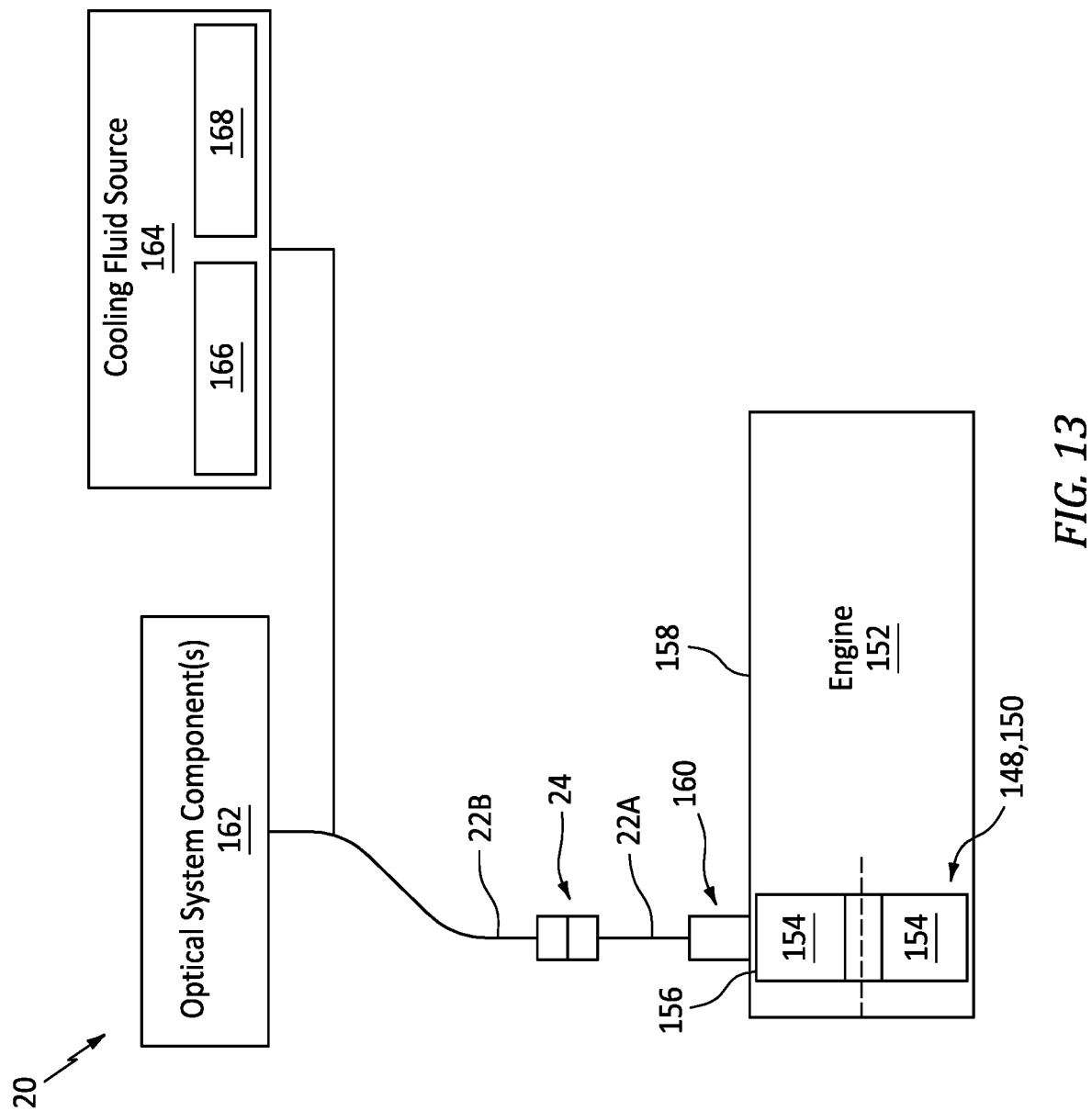
FIG. 13 is a schematic illustration of the optical system configured as a measurement system with an optical probe monitoring an engine.

The optical system 20 of FIG. 13 includes an optical probe 160 that is mounted to the wall 158; e.g., a duct wall housing the bladed rotor 150. This optical probe 160 includes the first conduit 22A (or alternatively the second conduit 22B). The optical system 20 of FIG. 13 also includes one or more other optical system components 162. These optical system components 162 are in signal communication with the optical probe 160 through the second conduit 22B (or alternatively the first conduit 22A). Examples of the optical system components 162 include, but are not limited to, a light emission device such as an LED or a laser, a light sensing device such as a light receptor, a processor, etc. Utilizing the conduits 22 and the conduit coupler 24 to optically couple the optical probe 160 to the optical system component(s) 162 may facilitate arranging the optical probe 160 in difficult to reach locations. For example, the optical probe 160 may first be routed, as needed, to mount with the wall 158. Then, the conduit coupler 24 may be assembled to connect the optical probe 160 to the other optical system component(s) 162. This may also be useful where the gas turbine engine 152 is configured with multiple optical probes 160 as shown, for example, in FIG. 14. Here, the optical probes 160 may similarly be arranged with the gas turbine engine 152 and then plugged into a harness for the optical system components 162.

Figure 14:
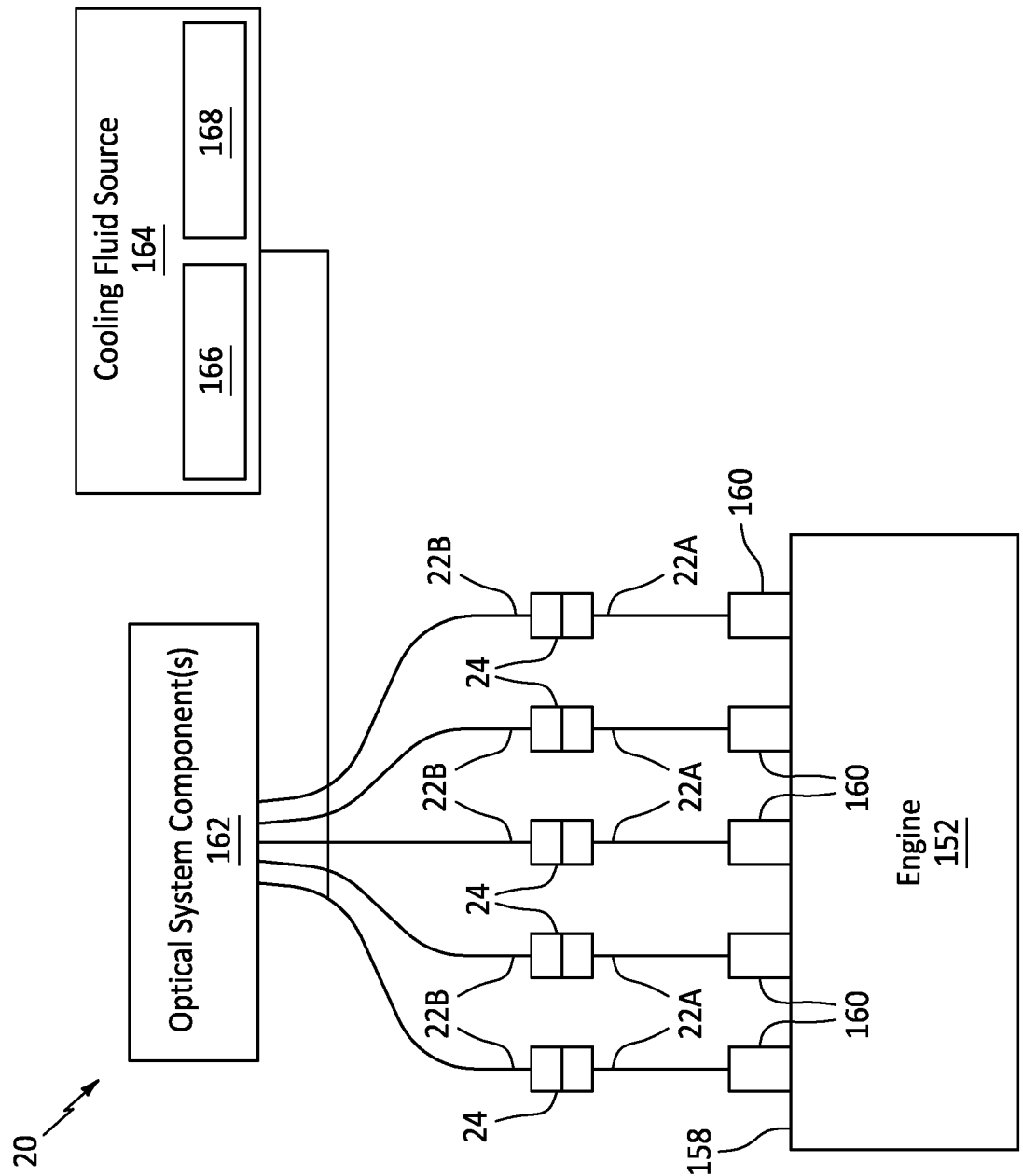
FIG. 14 is a schematic illustration of the measurement system configured with multiple of the optical probes.

Referring to FIGS. 13 and 14, the optical system 20 also include a cooling fluid source 164. This cooling fluid source 164 may be fluidly coupled with each optical probe 160 (and/or another downstream device or structure) through the conduits 22 and their fluid passages 44 (see FIG. 1) as well as the conduit coupler 24 and its ports 88 (see FIG. 1). Cooling fluid may thereby be provided to form an insulative shield along the conduits 22 and their optical fibers 32 and 34 (see FIG. 1). The cooling fluid may also be injected out from the respective optical probe 160 to facilitate cooling of a tip of that optical probe 160 and/or purging debris away from the probe tip. Examples of the cooling fluid include, but are not limited to, cool dry air, nitrogen ($N_2$) gas, argon (Ar) gas or another inert gas.

The cooling fluid source 164 may be configured as or otherwise includes a cooling fluid reservoir 166 (e.g., a tank, a pressure vessel, etc.) and/or a cooling fluid flow regulator 168 (e.g., a valve). The reservoir 166 is configured to contain the cooling fluid. The flow regulator 168 is configured to selectively direct (e.g., flow, meter, etc.) the cooling fluid from the reservoir 166 to the conduits 22 and their fluid passages 44 (see FIG. 1).

The optical system 20 may be arranged with various turbine engines as well as in other types of rotational equipment. The optical system 20, for example, may be arranged with a geared turbine engine where a geartrain connects one or more shafts to one or more rotors in a fan section, a compressor section and/or any other engine section. Alternatively, the optical system 20 may be arranged with a turbine engine configured without a geartrain; e.g., a direct drive turbine engine. The optical system 20 may be arranged with a turbine engine configured with a single spool or with two or more spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An optical system, comprising:
a conduit fitting comprising a receptacle;
a first connector disposed within the receptacle, the first connector including a first bore, a first counterbore and a first port radially outboard of the first bore;
a first conduit including a first optics line and a first fluid passage, the first conduit projecting longitudinally into the first counterbore and attached to the first connector, the first optics line projecting longitudinally into the first bore, and the first fluid passage fluidly coupled with the first port;
a first ferrule circumscribing the first connector; and
a first nut threaded onto the conduit fitting and configured to wedge the first ferrule radially between the first connector and the conduit fitting;
wherein the first fluid passage circumscribes and extends longitudinally along the first optics line.

2. The optical system of claim 1, wherein the first nut is configured to press the first ferrule longitudinally against the first connector to wedge the first ferrule radially between the first connector and the conduit fitting.

3. The optical system of claim 1, further comprising a first driver circumscribing the first connector, the first driver longitudinally engaged with and between the first nut and the first ferrule.

4. The optical system of claim 3, wherein the first nut is configured to wedge the first driver radially between the first ferrule and the first connector.

5. The optical system of claim 1, wherein the first connector passes longitudinally through an aperture in an endwall of the first nut.

6. The optical system of claim 1, wherein the first optics line comprises one or more optical fibers.

7. The optical system of claim 6, wherein
the first optics line further comprises a first optical sheath circumscribing and extending longitudinally along the one or more optical fibers; and
the first optical sheath projects longitudinally into the first bore and is attached to the first connector.

8. The optical system of claim 1, wherein the first port is one of a plurality of first ports in the first connector and fluidly coupled with the first fluid passage.

9. The optical system of claim 1, further comprising:
a second optics line comprising a plurality of second optical fibers;
the first optics line comprising a plurality of first optical fibers; and
each of the plurality of first optical fibers optically coupled to a respective one of the plurality of second optical fibers at an optical interface between the first optics line and the second optics line.

10. The optical system of claim 9, further comprising:
a conduit coupler configured to align an end of each of the plurality of first optical fibers with an end of the respective one of the plurality of second optical fibers; and
the conduit coupler including the conduit fitting and the first nut.

11. The optical system of claim 1, further comprising a second fluid passage fluidly coupled with the first fluid passage through the first port.

12. The optical system of claim 1, further comprising:
a second connector disposed within the receptacle, the second connector including a second bore, a second counterbore and a second port radially outboard of the second bore, and the second port fluidly coupled with the first port;
a second conduit including a second optics line and a second fluid passage, the second conduit projecting longitudinally into the second counterbore and attached to the second connector, the second optics line projecting longitudinally into the second bore and optically coupled with the second optics line, and the second fluid passage fluidly coupled with the second port;
a second ferrule circumscribing the second connector; and
a second nut threaded onto the conduit fitting and configured to wedge the second ferrule radially between the second connector and the conduit fitting.

13. The optical system of claim 12, further comprising:
a key projecting radially into a first connector groove, a second connector groove and a fitting groove;
the first connector further including the first connector groove;
the second connector further including the second connector groove; and
the conduit fitting further including the fitting groove.

14. An optical system, comprising:
a conduit fitting comprising a receptacle;
a first connector disposed within the receptacle, the first connector including a first bore, a first counterbore and a first port radially outboard of the first bore;

a first conduit including a first optics line and a first fluid passage, the first conduit projecting longitudinally into the first counterbore and attached to the first connector, the first optics line projecting longitudinally into the first bore, and the first fluid passage fluidly coupled with the first port;

a first ferrule circumscribing the first connector; and a first nut threaded onto the conduit fitting and configured to wedge the first ferrule radially between the first connector and the conduit fitting;

wherein the first conduit further includes a first tube;

wherein the first tube forms an outer peripheral boundary of the first fluid passage, and the first tube projects longitudinally into the first counterbore and is attached to the first connector; and wherein the first optics line projects longitudinally out from the first tube and into the first bore.

15. An optical system, comprising:

a conduit fitting comprising a receptacle;

a first connector disposed within the receptacle, the first connector including a first bore, a first counterbore and a first port radially outboard of the first bore;

a first conduit including a first optics line and a first fluid passage, the first conduit projecting longitudinally into the first counterbore and attached to the first connector, the first optics line projecting longitudinally into the first bore, and the first fluid passage fluidly coupled with the first port;

a first ferrule circumscribing the first connector;

a first nut threaded onto the conduit fitting and configured to wedge the first ferrule radially between the first connector and the conduit fitting;

a key projecting radially into a first connector groove and a fitting groove;

the first connector further including the first connector groove; and the conduit fitting further including the fitting groove.

16. The optical system of claim 15, wherein the key is bonded to the conduit fitting.

* * * * *